United States Patent [19]

Lasdon et al.

[11] Patent Number: 5,603,979
[45] Date of Patent: Feb. 18, 1997

[54] LOW FAT PEANUT BUTTER-LIKE PRODUCT BEING SHELF STABLE AT ROOM TEMPERATURES AND METHOD FOR MAKING THE SAME

[75] Inventors: Lloyd Lasdon, New York; Stuart Lasdon, Baiting Hollow, both of N.Y.

[73] Assignee: Peanut Wonder Corp., New York, N.Y.

[21] Appl. No.: 496,892

[22] Filed: Jun. 30, 1995

Related U.S. Application Data

[63] Continuation-in-part of Ser. No. 196,746, Feb. 15, 1994, abandoned.

[51] Int. Cl.⁶ ..................................................... A23L 1/38
[52] U.S. Cl. ................... 426/633; 426/464; 426/573; 426/575; 426/658; 426/661; 426/662
[58] Field of Search ..................... 426/573, 575, 426/661, 662, 633, 658, 464

[56] References Cited

U.S. PATENT DOCUMENTS

| | | | |
|---|---|---|---|
| 4,828,868 | 5/1989 | Lasdon et al. | 426/633 |
| 4,871,566 | 10/1989 | Farnum et al. | 426/632 |
| 4,891,235 | 1/1990 | Mizuguchi et al. | 426/281 |
| 4,938,987 | 7/1990 | Gannis et al. | 426/632 |
| 4,973,491 | 11/1990 | Shin et al. | 426/633 |
| 5,079,027 | 1/1992 | Wong et al. | 426/633 |
| 5,230,919 | 7/1993 | Walling et al. | 426/633 |
| 5,240,734 | 8/1993 | Izzo et al. | 426/633 |
| 5,366,754 | 11/1994 | Rudan et al. | 426/633 |

OTHER PUBLICATIONS

Norman Potter, *Food Science*, 3rd Ed., pp. 165 and 313–316 (1984).

*Primary Examiner*—Helen Pratt
*Attorney, Agent, or Firm*—Franklyn Schoenberg; Norman E. Lehrer; Jeffrey S. Ginsberg

[57] ABSTRACT

A water-based, low fat, peanut butter-like product having a pleasing texture and mouth-feel and being shelf stable at room temperatures and a method for producing the same. The peanut butter-like product includes defatted peanut flour, water, a humectant, a soluble salt, a natural gum, at least one ingredient selected from the group consisting of corn, malt, rice and potato syrup, a modified food starch, lecithin and conventional peanut butter. The peanut butter-like product has a water activity in the range of 0.80 to 0.85 and has 70 to 95% less fat than conventional peanut butter.

1 Claim, No Drawings

LOW FAT PEANUT BUTTER-LIKE PRODUCT BEING SHELF STABLE AT ROOM TEMPERATURES AND METHOD FOR MAKING THE SAME

CROSS-REFERENCE TO A RELATED APPLICATION

This application is a continuation-in-part of prior application Ser. No. 196,746, filed Feb. 15, 1994 now abandoned.

BACKGROUND OF THE INVENTION

The present invention relates to a low fat peanut butter-like product and, more particularly, to such a low fat peanut butter-like product that is shelf stable at room temperatures. The present invention also relates to a method for producing the above low fat peanut butter-like product.

Peanut butter is one of the most popular foods in American diet. It is enjoyed for its rich flavor and unique texture and mouth feel. While peanut butter is generally a healthy food, it is high in both fat and calories. A 32 gram portion of conventional peanut butter typically contains about 190 calories, at least 70 percent of which are from fat. For many people who are obese or who have medical problems, a low calorie, low fat, diet is imperative.

Further, it is well documented that most of the U.S. population consumes too much fat. Many people who do not have medical problems nonetheless choose to reduce their fat intake.

Some reduced calorie and reduced fat peanut and peanut flour products have been created. In these products, calories are reduced by partially removing fats from the peanuts or peanut flours. Unfortunately, this means of caloric reduction sacrifices certain desirable sensory properties. For example, the reduced fat peanut flours described in U.S. Pat. Nos. 4,113,599 and 3,947,599 are very bland and almost tasteless. Further, these products are typically dry, generally having a water content of under 5 percent by weight. As a consequence, the use of these products has been limited to base protein materials which are used in the production of other food products.

U.S. Pat. No. 4,828,868 ("the '868 patent"), issued to the present inventors on May 9, 1989 and incorporated by reference into this specification, discloses a low fat (70–95% less fat than conventional peanut butter), low calorie peanut butter type product of processed peanut flour and water (plus other ingredients). The product of the '868 patent is not shelf stable at room temperatures, however, and requires refrigeration during all stages of storage after packaging, both before and after opening.

Since consumers are accustomed to conventional peanut butter being marketed on unrefrigerated grocery shelves and being storable for an extended period at home without refrigeration, it is desirable from a marketing standpoint that a low fat, low calorie peanut butter-like product be similarly shelf stable at room temperatures.

The book, *Food Science*, by Norman N. Potter, Third Edition, A.V.I.(1984) describes the term "water activity level". Qualitatively, water activity is a measure of unbound, free water in a system that is available to support biological and chemical reactions. Since water activity is not the same as absolute water content, two foods with the same water content can have very different water activities. That is, the water activity level depends on the degree to which water is free or otherwise bound to food constituents. When a food is in moisture equilibrium with its environment, the water activity of the food will be quantitatively equal to the relative humidity in the head space of the container divided by 100.

In general, as the water activity ($A_w$) of a food product increases, its shelf life decreases. That is, the food product becomes more susceptible to mold, fungus, and bacterial growth as the water activity increases. The U.S. Food and Drug Administration defines a low acid food product with a pH of greater than 4.6 as "shelf stable" if it has a water activity of 0.85 or less. All of the products described in the '868 patent have water activities over 0.95 and usually over 0.97.

Moreover, besides requiring constant refrigeration (both before and after opening), the peanut butter-like products made in accordance with the '868 patent lack the rich taste and desirable mouth feel that typically characterize real peanut butter. This is due in part to the peanut ingredient disclosed in the '868 patent being defatted peanut flour. Defatted peanut flours are relatively bland and deliver limited peanut flavor.

In order to improve the flavor and mouth feel of the peanut butter-like products made in accordance with the '868 patent, natural peanut butter was added to the product in quantities sufficient to increase the sensory qualities but to still permit the product as a "low fat product". This proved to be unacceptable as the addition of conventional peanut butter to the product having a water activity in excess of 0.95 resulted in the rapid deterioration of the flavor and texture of the product.

Recently, there have been developed reduced fat peanut butter-like products containing 10%–30% less fat than conventional peanut butter and middle range peanut butter-like products containing 30%–50% less fat than conventional peanut butter. Some of these products have relatively low water activities and thereby acceptable shelf stability. For example, U.S. Pat. No. 5,240,734 discloses such a reduced fat peanut butter-like composition that has a water activity which is satisfactory for shelf stability. The composition includes peanut butter in the amount of 50% by weight. Accordingly, while the composition has less fat than conventional peanut butter, it still does not approach the FDA requirements for a low fat product. Specifically, the FDA requires such a product to contain 3.0 or less grams of fat per 32 gram serving.

U.S. Pat. No. 5,366,754 is directed to a reduced fat peanut butter-like product and a method of making the same. This patent suggests that it provides a method for producing a peanut butter-like product that has a low fat content and a water activity of 0.91 after pasteurization. However, the peanut raw materials utilized to make this product are not commercially available. Further, a water activity of 0.91 does not denote a shelf stable product according to FDA standards.

SUMMARY OF THE INVENTION

The present inventors have made several important discoveries. They found that reducing the water activity of processed low fat peanut flour and water products to 0.85 or lower by increasing the levels of sugars, salts, and certain other compounds (such as glycerine, sorbitol and other humectant compounds) that are known to reduce water activity, makes the resultant product shelf stable without degrading the flavor or texture of the same.

The present inventors also learned that by separately hydrating gums, such as Carrageenan, Guar, or Locust Bean with certain dextrins, first in water and then with sugar syrups and humectants at temperatures greater than 180° F., the water activities of the low fat peanut butter-like products, to which such hydrated gum compositions are added, are further reduced. Furthermore, these gums and dextrins, in proper combinations, make the texture and spreadability of the ultimate products more like conventional peanut butter.

The present inventors further discovered that a low fat peanut premix or matrix resulting from processing defatted peanut flours, sugars, salts and water and having a water activity of 0.85 or lower in accordance with the present invention is now compatible with conventional peanut butter. That is, by reducing the water activity to 0.85 or below, the low fat premix (containing from 15% to as much as 40% water) can be blended with conventional peanut butter without loss of the flavor of the added peanut butter. The addition of conventional peanut butter improves the flavor, texture, and mouth feel, and the blended combinations now constitute a very appealing low fat peanut butter-like alternative that has an acceptably long shelf life.

As a result of these discoveries, the improved water based, low fat peanut premix of the present invention with the water activity reduced to a level of 0.85 or less (as herein described) and a fat content of 95% or less than conventional peanut butter can be blended with conventional peanut butter to create a range of low fat combinations (70–95% less fat). The fat content in the resultant combinations depends on the amount of conventional peanut butter that is blended with the premix products.

Accordingly, the present invention provides a low fat peanut premix and a low fat peanut butter-like product (i.e., the low fat peanut premix mixed with conventional peanut butter), each having a water activity of 0.85 or less, and in particular, from 0.80 to 0.85.

In a preferred embodiment, the low fat peanut butter-like product, derived from the low fat peanut premix, of the present invention will contain from 5 to 30 percent peanut butter by weight and more preferably, about 10 to 20 percent peanut butter by weight. These low fat peanut butter-like products have 70 to 95 percent less fat than conventional peanut butter and water activities of 0.85 or less.

The low fat peanut butter-like product of the present invention includes:

commercially available defatted peanut flour containing from 5–15% fat;

water;

glycerine and/or sorbitol;

at least one of sucrose, glucose and fructose syrups;

at least one of corn, malt, rice, and potato syrups (all having a D.E. of less than 30°);

salt;

from 5 to 30 percent conventional peanut butter by weight (and more preferably from about 10–20 percent conventional peanut butter by weight);

at least one of a pigment such as calcium carbonate and titanium dioxide;

at least one of a modified food starch, a maltodextrin or a tapiocadextrin, and a natural gum such as Carrageenan, Guar, or Locust Bean.

DETAILED DESCRIPTION OF THE PREFERRED EMBODIMENT

Conventional peanut butter consists of a mixture of finely ground roasted peanuts, sugar, salt and optionally, stabilizers. It is made by roasting and grinding peanuts. Conventional peanut butters possess a pleasing texture and mouthfeel. Stabilizers are typically added to prevent oil from separating.

In the following, the term "low fat peanut premix" or "low fat peanut matrix" will refer to a product which has 95% or less fat than conventional peanut butter and has a water activity of 0.85 or less. The term "low fat, peanut butter-like product" will refer to a product which is obtained by blending the low fat peanut premix with conventional peanut butter and which combination has from 70 to 95% less fat than conventional peanut butter and preferably 3.0 grams or less of fat per serving portion (about 32 grams). The peanut butter-like product has a water activity of 0.85 or less and preferably from 0.80 to 0.85.

In general, as the water activity of a food product increases, its shelf life decreases. That is, as the water activity increases, the product becomes more susceptible to mold, fungus, and bacterial growth. The U.S. Food and Drug Administration (FDA) has defined a low acid food product with a pH of greater than 4.6 as "shelf stable" if it has a water activity of 0.85 or less. Known low calorie, low fat peanut butter-like products, such as the one described in the '868 patent, are not shelf stable at room temperature since their water activities are greater than 0.85. A typical product formulation for the '868 patent is set forth in TABLE I.

TABLE I

| INGREDIENT | AMOUNT |
| --- | --- |
| Peanut Flour | 9.00 lbs. |
| Water | 13.50 lbs. |
| Corn Syrup | 6.75 lbs. |
| Molasses | 1.875 ozs. |
| Xanthan Gum | 0.57 ozs. |
| Lecithin | 0.86 ozs. |
| Sugar | 12.00 ozs. |
| Salt | 6.75 ozs. |
| Coloring | 0.93 ozs. |
| Potassium Sorbate | 0.54 ozs. |
| Flavorings | 2.40 ozs. |

This formulation yields a product having an approximate water activity of 0.97 and therefore requires refrigeration to resist biological degradation.

The low fat peanut butter-like products of the present invention each have a water activity of 0.85 or less, and in particular, from 0.80 to 0.85. This low water activity level is accomplished by providing formulations having increased levels of water soluble ingredients, such as, for example, sugars and salts, beneficial humectant compounds, such as glycerine and sorbitol, and hydrated gums such as Carrageenan, Guar and Locust Bean.

The defatted peanut flour suitable for use in the products of the present invention may be any of several such commercially available flours and may have as little as about 3% to about 35% fat. In the preferred embodiment, however, the flour has from 5 to 15% fat.

In particular, the low fat peanut premix product of the present invention includes water in an amount of from about 15% to about 40%, salt, such as sodium chloride, in an amount of from 1.2% to about 2.0%, natural gums, such as Carrageenan, Guar, and/or Locust Bean, in an amount of from about 0.1–1.5%, pigments such as calcium carbonate and/or titanium dioxide in an amount of from about 0.1% to 1.1%, a syrup ingredient, such as corn, malt, potato or rice, with a D.E. (dextrose equivalence) of 30° or less and in an amount of from about 20% to about 35%, molasses in an amount from about 6% to about 12%, a humectant such as glycerine and/or sorbitol in an amount from of from about 5% to about 13%, defatted peanut flour (5–15% fat) in an amount of from about 5% to about 20% and at least one of a modified food starch, a maltodextrin or a tapiocadextrin in an amount of about 0.5 to about 1.5%.

Sweetening agents such as sucrose, fructose, glucose and/or honey, preferably in syrup form, can also be added in an amount of from about 1 to about 5.5%. Additional optional ingredients include anti-oxidants, such as sodium ascorbate and or ascorbic acid, in an amount of from about 0.0005% to about 0.005% to improve stability.

Due to its reduced water activity level, the low fat peanut premix of the present invention can be blended with limited amounts of conventional, generally finely ground, peanut butters (both natural and/or modified) as both a flavoring and texturing agent. That is, by blending from 5 percent to 30 percent, preferably about 10 to 20 percent, of a conventional peanut butter with the low fat peanut premix, excellent peanut butter-like flavors and textures are attained. Moreover, such a blend has 70 to 95 percent less fat by weight than conventional peanut butter. An emulsifier such as lecithin in an amount of 0.2% to about 1.0% can be added to help unite the oil based system (conventional peanut butter) with the water based, low fat, peanut premix. Oil or water based flavors and tocopherols (oil soluble antioxidants) can also be added.

The low fat, peanut butter formulations of the invention are preferably processed in the following manner. The natural gums are pre-hydrated in order to improve the viscosity and texture of the final product as well as further reduce the water activity thereof. This is accomplished by first feeding the NaCl, natural gums, CaCO$_3$ and/or TiO$_2$ and the dextrins into a heated jacketed mixing tank. The water is then added and the mixture (hereinafter "mixture 1") is vigorously agitated for a time sufficient to blend the ingredients. During the blending step, mixture 1 is heated to a temperature of from about 180° F. to 195° F. to promote complete solution and hydration.

The syrups (malt, corn, potato or rice), molasses, glycerine and/or sorbitol, sucrose or fructose syrup, and peanut flour, preferably in the listed order, are combined and blended in a heated jacketed mixing tank. During this blending step, the mixture (hereinafter "mixture 2") is heated to a temperature sufficient to make the same fluid, generally about 160° F. to 190° F. While the temperature is maintained, mixtures 1 and 2 are fed into a multistage in-line high shear homogenizing mixer, such as a Ross or Greerco, in order to mill and/or homogenize the same until a smooth product having a creamy mouth feel and a particle size of generally no larger than 50 mesh, preferably no larger than 200 mesh results. This resultant product is the low fat peanut premix. It should be noted that water soluble anti-oxidants like ascorbic acid and/or sodium ascorbate (in the amount from about 0.0005–0.005%) can be added to provide stability.

The low fat peanut premix is then transferred to a reactor vessel such as a kettle provided with a scraped surface agitator or through a scraped surface heat exchanger. The peanut butter, lecithin, peanut butter flavor and tocopherols ("mixture 3") are then combined with the low fat peanut premix in the reactor vessel and aggressively blended at a temperature of 180° F. to 190° F. for about 1 to 10 minutes to obtain a low fat peanut butter-like product which is smooth, has a creamy mouth feel and has a particle size of preferably no larger than 200 mesh. More specifically, the resultant low fat peanut premix is blended with conventional peanut butter in the amount of 5 to 30%, and preferably from about 10 to 20%, to provide a low fat (70 to 95% less fat than conventional peanut butter), peanut butter-like, blended product that is shelf stable, and preferably contains 3.0 grams or less of fat per serving. Finally, the low fat peanut butter-like product is hot packed in suitable containers.

The addition of the conventional peanut butter improves the flavor, texture and mouth feel of the product. The lecithin helps unite the oil based ingredients, the peanut butter and peanut butter flavor, with the water based premix.

This low fat peanut butter-like product is compatible with and can be blended with fruit preserves, etc. as set forth in U.S. Pat. No. 5,034,242 (incorporated herein by reference).

A specific example of a formula for low fat, peanut butter-like, blended product according to the present invention, which has all of the advantages mentioned above, is set forth in TABLE II.

TABLE II

| INGREDIENT | PERCENT BY WEIGHT |
| --- | --- |
| Defatted Peanut Flour | 18 |
| Water | 24 |
| Corn, Malt, Potato or Rice Syrup (26° DE) | 20 |
| Molasses | 12 |
| Glycerine or Sorbitol | 3.0 |
| CaCO$_3$ and/or TiO$_2$ | 1.0 |
| NaCl | 1.5 |
| Maltodextrin and/or Tapiocadextrin | 1.0 |
| Sucrose or Fructose | 4.0 |
| Natural Gums | 1.0 |
| Peanut Flavors | 0.5 |
| Lecithin | 1.0 |
| Peanut Butter | 13 |

This example is merely illustrative, and is not intended to limit the possible formulations within the scope of the present invention.

Many variations and modifications of the product and process of the present invention will be suggested to one of ordinary skill in the art upon a reading of the specific embodiments which are described in this specification. The scope of this invention is, however, not limited to the specific embodiments described herein. The present invention is defined and limited only by the claims which conclude this specification.

What is claimed is:

1. A method for making a water based, low fat peanut butter-like product having a water activity of from about 0.80 to about 0.85 and from about 70% to about 95% less fat than conventional peanut butter comprising the steps of:

(a) providing the following ingredients: water in an amount of from about 15% to about 40% by weight, at least one of a modified food starch, a maltodextrin or a tapiocadextrin in an amount of from about 0.5% to about 1.5% by weight, a soluble salt in an amount of from about 1.2 to about 2.0% by weight, at least one pigment selected from a group consisting of CaCO$_3$ and TiO$_2$ in an amount of about 0.01% to 1.1% by weight, and at least one natural gum selected from the group consisting of Carrageenan, Locust Bean and Guar in an amount of from about 0.5% to about 1.5% by weight;

(b) combining the ingredients of step (a) with vigorous agitation at a temperature of over 180° F. to 195° F. for a time necessary to hydrate said natural gum;

(c) providing and admixing defatted peanut flour in an amount from about 5.0% to about 20% by weight, at least one syrup selected from the group consisting of corn syrup, malt syrup, rice syrup and potato syrup in an amount of from about 20 to about 35% by weight, molasses in an amount of from about 6.0 to about 12% by weight, a humectant in an amount of from about 5.0 to about 13% by weight at a temperature sufficient to form a fluid mixture of the same;

(d) admixing the mixture of step (c) with the mixture of step (b);

(e) feeding the mixture of step (d) into a particle reduction device for a sufficient time to obtain a product that has a particle size of no larger than approximately 200 mesh;

(f) providing and admixing conventional peanut butter in an amount from about 5.0% to about 30% by weight and lecithin in an amount of from about 0.2% to about 1.0% by weight, and (g) aggressively blending the mixture of step (f) with the product of step (e) at a temperature of about 180° F. to 190° F. for about 1 to 10 minutes in order to obtain said low fat peanut butter-like product.

* * * * *